United States Patent [19]

Domenico

[11] 3,890,332

[45] June 17, 1975

[54] HALOPYRIDYL THIOALKYLTHIO CYANATES

[75] Inventor: Penelope B. Domenico, Fairfax, Va.

[73] Assignee: The Dow Chemical Company, Midland, Mich.

[22] Filed: Apr. 15, 1974

[21] Appl. No.: 460,831

[52] U.S. Cl............................ 260/294.8 G; 424/263
[51] Int. Cl............................................... C07d 31/50
[58] Field of Search ............... 260/294.8 G, 294.8 F

[56] References Cited
UNITED STATES PATENTS

| | | | |
|---|---|---|---|
| 3,758,482 | 9/1973 | Domenico | 260/294.8 G |
| 3,787,422 | 1/1974 | Domenico | 260/294.8 F |
| 3,787,425 | 1/1974 | Domenico | 260/294.8 G |

OTHER PUBLICATIONS

Friedrich et al., Chem. Abstracts, Vol. 63, (6), 6971F to 6972-F (Sept. 1965).

*Primary Examiner*—Alan L. Rotman
*Attorney, Agent, or Firm*—S. Preston Jones; William M. Yates

[57] ABSTRACT

Compounds corresponding to the formula

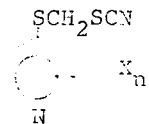

wherein X represents chloro or bromo and $n$ represents an integer of 2 to 4, are prepared. These compounds have been found to be useful as bactericides and fungicides.

6 Claims, No Drawings

HALOPYRIDYL THIOALKYLTHIO CYANATES

PRIOR ART

Various pyridyl thioalkylthiocyanates are known and are taught in Belgian Pat. No. 722,018. Other related

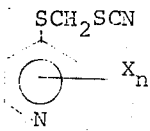

compounds are taught in Chemical Abstracts, Vol. 63, (1965) 6971f through 6972f, especially 6972b; and U.S. Pat. No. 3,758,482.

SUMMARY OF THE INVENTION

The present invention is directed to halopyridyl thioalkylthiocyanates corresponding to the formula In this and succeeding formulae X represents chloro or bromo and $n$ represents an integer of from 2 to 4.

For convenience, the compounds embraced by the generic formula will be hereinafter identified as halopyridyl thioalkylthiocyanates.

The halopyridyl thioalkylthiocyanates of the present invention are crystalline solids or oils which are of low solubility in water and of moderate solubility in common organic solvents. These compounds have low phytotoxicity and are suitable for use as bactericides and fungicides.

The compounds of the present invention can be prepared by the reaction of an appropriate halo substituted 4-[(chloromethyl)thio]pyridine with an alkali metal thiocyanate in the presence of a solvent. This reaction can be represented as follows:

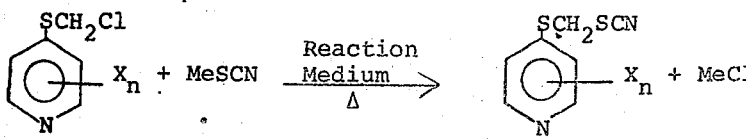

wherein X and $n$ are as hereinbefore defined and Me represents sodium, lithium, potassium, cesium or rubidium.

In carrying out this reaction, the reactants are contacted together in the presence of an inert reaction medium or solvent such as, for example, dimethylformamide, hexamethylphosphoramide, or 4-formylmorpholine. The reaction is preferably carried out at room temperature, although temperatures in the range of about 0° to about 100°C can be employed. The reaction is usually carried out at atmospheric pressure. While the reaction consumes the reactants in equimolar amounts, it is preferred that about a 10 to about a 150 percent excess of the alkali metal thiocyanate be employed.

The reactants are maintained together, under agitation, until the reaction is complete. The required reaction time is usually between about 30 minutes and 4 hours. Upon completion of the reaction, the reaction mixture is diluted with cold water to precipitate out any solid product. The solid product can be purified, if desired, by recrystallization from benzene, hexane, pentane or mixtures thereof.

An alternative procedure for the preparation of the above halopyridyl thioalkylthiocyanates involves the reaction of an appropriate halo substituted alkai metal thiopyridine with chloromethylthiocyanate in the presence of a reaction medium or solvent. This reaction can be represented as follows:

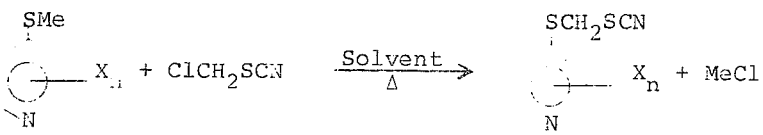

wherein X, $n$, and Me are as hereinbefore defined.

In carrying out this reaction, the alkali metal thiopyridine can be prepared in situ by the reaction of a halomercaptopyridine with an alkali metal in a solvent. This in situ preparation is usually carried out by first dissolving the alkali metal in an alkanol and admixing this, at room temperature, with a solution of the halomercaptopyridine in an alkanol. The chloromethylthiocyanate can thereafter be added directly to the alcoholic solution of the halo alkali metal thiopyridine and this mixture refluxed until the completion of the reaction, usually from about 30 minutes to about 2 hours. After the completion of the reaction, the reaction mixture is filtered to remove the alkali metal chloride salt by-product. The alcohol is thereafter removed by evaporation under reduced pressure. The purified product can be recovered from the residue by crystallization from a solvent such as benzene, hexane or mixtures thereof.

DESCRIPTION OF SOME PREFERRED EMBODIMENTS

The following examples illustrate the present invention and the manner by which it can be practiced, but, as such, should not be construed as limitations upon the overall scope of the same.

EXAMPLE I 2,6-Dichloro-4-[(thiomethyl)thiocyanato]pyridine

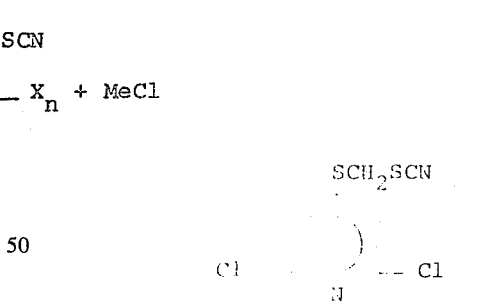

To a solution of 5.0 grams (0.219 mole) 2,6-dichloro-4-chloromethylthio pyridine in 15 milliliters of dimethylformamide was added, at room temperature with stirring, a solution of 3.19 grams (0.329 mole) of potassium thiocyanate in 15 milliliters of dimethylformamide. The mixture was stirred at room temperature for about one hour and heated to 60°–80°C and stirred at a temperature within this temperature range for about 1 hour. At the completion of this reaction, the reaction mixture was filtered to remove the potassium chloride by-product and the resultant mother liquor poured into ice water. The water was decanted off and fresh water added to sticky solid which remained. Upon washing in the water, a waxy solid was obtained and this solid was recovered by filtration. The solid was taken up in benzene and dried with sodium sulfate. The benzene was removed and the solid was recrystallized in hexane. The desired 2,6-dichloro-4-[(thiomethyl)-thiocyanato]pyridine product was recovered as a fluffy yellow-tan solid. The product was recovered in a yield of 3.0 grams (55 percent of theoretical) and melted at 55°C. Upon analysis, the product was found to have chlorine and sulfur contents of 27.84 and 25.48 percent, respectively, as compared with the theoretical contents of 28.23 and 25.53 percent respectively, as calculated for the above named compound.

EXAMPLE II 2,3,5-Trichloro-4-[(thiomethyl)thiocyanato]pyridine

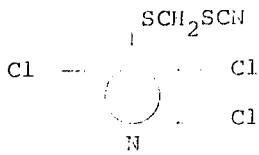

A solution was prepared by dissolving 0.77 grams (0.023 mole) of sodium metal in 25 milliliters of 28 absolute ethanol. This soluton was slowly added to a solution of 5 grams (0.023 mole) of 2,3,5-trichloro-4-mercaptopyridine in hot ethanol. This mixture was refluxed for 45 minutes and 2.7 grams (0.025 mole) of chloromethylthiocyanate was added thereto. This mixture was refluxed for 1 hour. The sodium chloride which formed was removed by filtration, followed by the removal of the ethanol by evaporation under reduced pressure. The oil which remained as a residue was washed with a mixture of benzene and hexane. The solvent mixture was removed. The residue was allowed to stand and crystals started to form. Hexane was added and after crystal formation ceased the hexane removed. The residue was cooled and filtered to recover the desired 2,3,5-trichloro-4-[(thiomethyl)thiocyanato]pyridine product. The product melted at 96°C and upon analysis was found to have carbon, hydrogen, chlorine, nitrogen and sulfur contents of 29.8, 1.3, 36.9, 9.4 and 22.2 percent respectively, as compared with the theoretical contents of 29.5, 1.1, 37.3, 9.8 and 22.5 percent respectively, as calculated for the above named structure.

EXAMPLE III 2,3,5,6-Tetrachloro-4-[(thiomethyl)thiocyanato]pyridine

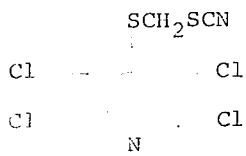

To a stirring solution of 10.0 grams (0.34 mole) of 2,3,-5,6-tetrachloro-4-chloromethylthiopyridine in 50 milliliters of dimethylformamide was added, at room temperature, 3.4 grams (0.035 mole) of potassium thiocyanate in 25 milliliters of dimethylformamide. The mixture was allowed to stir for 1 hours at room temperature. The temperature of the mixture was raised to 40°C and then to 100°C and the mixture stirred at this temperature for 1 hour. After completion of the reaction, the reaction mixture was poured into cold water. The yellow-tan solid which precipitated was recovered by filtration. The crude solid was taken up in benzene and dried with sodium sulfate. A portion of the benzene was evaporated off and hexane was added. The mixture was cooled and the 2,3,5,6-tetrachloro-4-[(thiomethyl)thiocyanato]pyridine product was recovered by filtration and thereafter recrystallized from hexane. The product melted at 118°–120°C and was recovered in a yield of 4.8 grams (45 percent of theoretical). Upon analysis, the product was found to have carbon, hydrogen, chlorine, nitrogen and sulfur contents of 26.44, 0.73, 44.42, 8.77 and 19.86 percent, respectively, as compared with the theoretical contents of 26.23, 0.63, 44.25, 8.76 and 20,00 percent, respectively, as calculated for the above named compound.

The following compounds of the present invention are prepared in accordance with the methods hereinbefore set forth.

2,6-Dibromo-4-[(thiomethyl)thiocyanato]pyridine having a molecular weight of 340.05;

3,5-Dichloro-4-[(thiomethyl)thiocyanato]pyridine having a molecular weight of 251.15;

2,3,5-Tribromo-4-[(thiomethyl)thiocyanato]pyridine having a molecular weight of 418.97;

3,6-Dichloro-4-[(thiomethyl)thiocyanato]pyridine having a molecular weight of 251.15; and 2,3,5,6-Tetrabromo-4-[(thiomethyl)thiocyanato]-pyridine having a molecular weight of 497.89.

In accordance with the present invention, it has been discovered that the halopyridylthioalkylthiocyanates can be employed for the control of may bacterial and fungal organisms. In still further operations, the compounds of the present invention or compositions containing them as toxic constituents can be included in and on plaster, ink, wallboard, textiles, paper, adhesives, soaps, synthetic detergents, cutting oils, polymeric materials, embalming fluids, oil paints and latex paints to prevent the attack of various fungal pests and the subsequent economic loss due to the degradation of such products by micro-organisms. Also, the compounds can be distributed in textiles or cellulosic materials to preserve and protect such products from the attack of the organisms of rot, mold and decay.

The exact concentration of the toxicant to be employed in the treating compositions is not critical and may vary considerably provided the required dosage of the effective agent is supplied in the ink, adhesive, soap, cutting oil, polymeric material, paint, textile, paper, or growth medium. The concentration of toxicant in liquid compositions generally is from about 0.0001 to 50 percent by weight. Concentrations up to 95 percent by weight are oftentimes conveniently employed, particularly in concentrate compositions. In dusts, the concentrations of the toxicant can be from about 0.1 to 95 percent by weight. In compositions to be employed as concentrates, the toxicants can be present in a concentration of from 5 to 98 percent by weight. For use as a spray, it is often convenient to prepare the compounds as wettable powders.

In a representative operation, 2,6-dichloro-4-[(thiomethyl)thiocyanato]pyridine when employed as the sole toxicant in a nutrient agar at a concentration of 10 parts by weight of the compound per million parts of agar was found to give 100 percent kill and control of the organisms Staphylococcus aureus, Candida albicans, Mycobacterium phlei, Bacillus subtilis, Trichophyton mentagrophytes, Candida pelliculosa, Pullularia pullulans, Cephaloascus fragans, Ceratocystis ips, Trichloderma sp Madison P-42, *Rhizopus nigricans* and *Aspergillus terreus*.

In an additional operation, 2,3,5-trichloro-4-[(thiomethyl)thiocyanato]pyridine was found to give 100 percent kill and control of the organisms *Staphylococcus aureus, Candida albicans, Trichophyton mentagrophytes, Bacillus subtilis, Aspergellus terreus, Cadida pelliculosa, Pullularia pullulans, Mycobacterium pheli, Ceratocystis ips, Cephaloacus fragans, Trichoderma sp. Madison P-42*, and Rhizopus nigricans, when employed as the sole toxicant in a nutrient agar at a concentration of about 10 parts by weight of the compound per million parts of agar.

In another operation, 2,3,5,6-tetrachloro-4-[(thiomethyl)thiocyanato]pyridine was found to give 100 percent kill and control of the organisms *Mycobacterium phlei, Trichophyton mentagrophytes, Cephaloascus fragans, Aspergillus terreus, Ceratocystis ips* and *Trichoderma sp. Madison P-42*, when employed as the sole toxicant in a nutrient agar at a concentration of about 10 parts by weight of the compound per million parts of agar.

What is claimed is:

1. A compound corresponding to the formula

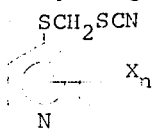

wherein X is chloro or bromo and *n* is an integer of from 2 to 4.

2. The compound of claim 1 corresponding to the formula

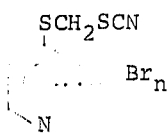

3. The compound of claim 1 corresponding to the formula

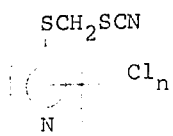

4. The compound of claim 3 which is 2,6-dichloro-4-[(thiomethyl)thiocyanato]pyridine.

5. The compound of claim 3 which is 2,3,5-trichloro-4-[thiomethyl)thiocyanato]pyridine.

6. The compound of claim 3 which is 2,3,5,6-tetrachloro-4-[(thiomethyl)thiocyanato]pyridine.

* * * * *